Aug. 9, 1960

C. W. BING 2,948,162

RING ASSEMBLY

Filed Aug. 7, 1958

CHARLES W. BING
INVENTOR.

BY
ATTORNEY

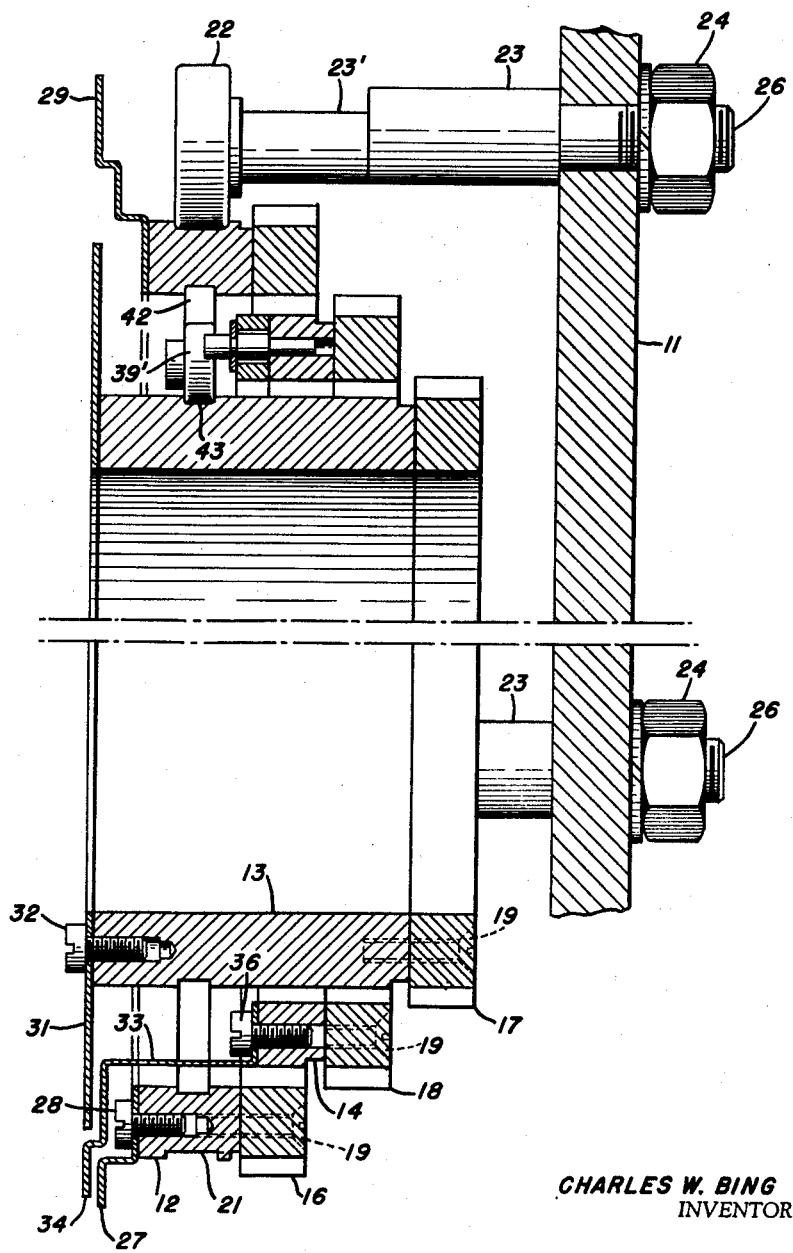

Aug. 9, 1960     C. W. BING     2,948,162
RING ASSEMBLY
Filed Aug. 7, 1958     3 Sheets—Sheet 3
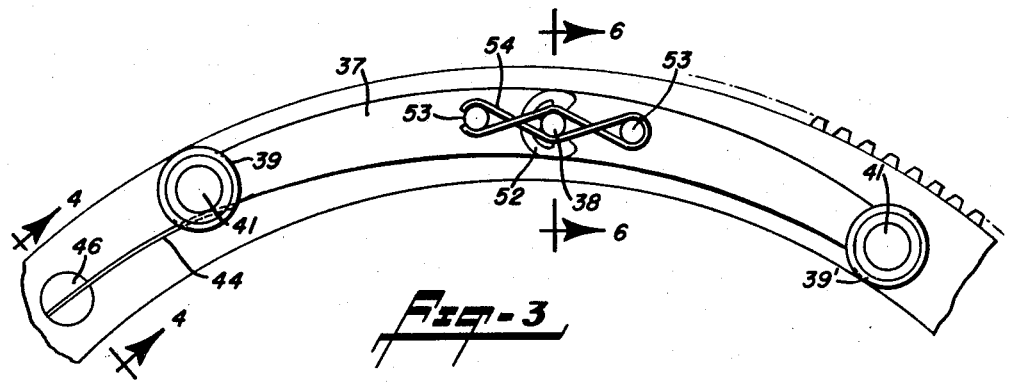
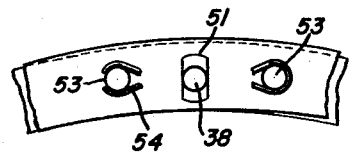
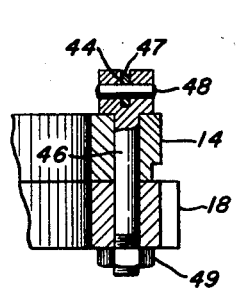
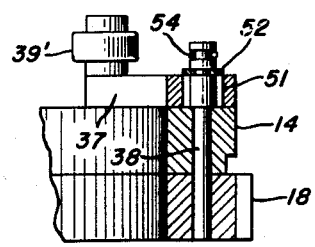
CHARLES W. BING
INVENTOR.
BY
ATTORNEY

United States Patent Office 2,948,162
Patented Aug. 9, 1960

2,948,162
RING ASSEMBLY

Charles W. Bing, Newark, N.J., assignor to Daystrom, Incorporated, Murray Hill, N.J., a corporation of New Jersey Filed Aug. 7, 1958, Ser. No. 753,672

9 Claims. (Cl. 74—399)

This invention relates to a display indicator and more particularly to a ring gear assembly for use therein.

It is often desirable to display a plurality of indications of quantities under measurement in a single viewing area at the face of a single instrument, rather than providing a separate instrument for each of the required indications wherein the indications appear in separate viewing areas. Often, in order to properly display the required information in a single viewing area, a plurality of concentrically rotating elements are necessary for positioning of the various indicator markings, scales, and indices. For example, in aircraft use, an instrument for the presentation of several functions relating to the horizontal situation of the aircraft, is desirable. Such an instrument, commonly called a horizontal situation display indicator, provides, among other things, indications of the aircraft's heading, the desired heading, and the bearing of a station or target. In one form of the instrument, the aircraft's heading is indicated by a rotatable compass card positioned by a remote signal from the aircraft compass system, the heading being indicated by reading the card against a fixed lubber line. Rotating about the rotatable compass card, and concentrically therewith are markers indicating the desired heading and the bearing of a station or target against the compass card. For accurate indications, the compass card, desired heading, and bearing indices must rotate about a common axis.

The novel ring gear assembly of my invention includes three coaxially rotatable ring gears upon which the individual scale and indices are mounted. The individual rings of the ring gear assembly may be driven by suitable compass card, heading, and bearing servo motors in the aircraft navigational equipment through suitable linkage and gearing.

An object of this invention is the provision of an arrangement for rotatably mounting coaxial inner, outer and center rings, which arrangement is of simple construction and easily adjusted to provide a true coaxial arrangement of the rings.

An object of this invention is the provision of a ring gear assembly having three rotatable ring gears which are easily manufactured and assembled, the said assembly including a novel arrangement for coaxially mounting the rotatable rings.

An object of this invention is the provision of a ring assembly including three coaxially rotatable rings and a compensating mechanism to compensate for minor eccentricity of the rings, which compensating mechanism permits larger allowable machining tolerances on the raceway diameters of the rings, and which permits large dimensional changes due to thermal expansion without adversely affecting ring rotation.

An object of this invention is the provision of an arrangement for rotatably mounting coaxial inner, outer and center rings, comprising, a plurality of rocker arms pivotally mounted intermediate the ends thereof on the said center ring, and means biasing the said rocker arms to maintain one end of each in engagement with an inner surface of the outer ring and the other end of each in engagement with an outer surface of the inner ring.

An object of this invention is the provision of a ring gear assembly comprising inner, outer, and central ring gears, means pivotally mounting a rocker arm on the face of the central ring gear, bearings mounted on the ends of the said rocker arms, and internal and external raceways formed on the respective outer and inner ring gears within which the bearings on the respective rocker arm ends are rotatably positioned.

These and other objects and advantages will become apparent from the following description when taken with the accompanying drawings. It will be understood that the drawings are for purposes of illustration only, and are not to be construed as defining the scope or limits of my invention, reference being had to the appended claims for the latter purpose.

In the drawings wherein like reference characters refer to like parts in the several views:

Figure 2 is a cross-sectional view taken on line 2—2 of Figure 1 and drawn to an enlarged scale;

Figure 3 is an enlarged fragmentary top view of the center ring gear showing a pivotal rocker arm attached thereto;

Figure 4 is an enlarged fragmentary sectional view taken on line 4—4 of Figure 3;

Figure 5 is an enlarged fragmentary top view of the pivotal connection for a rocker arm, parts being shown broken away and removed for clarity; and Figure 6 is an enlarged fragmentary sectional view taken on line 6—6 of Figure 3.

Figure 1:
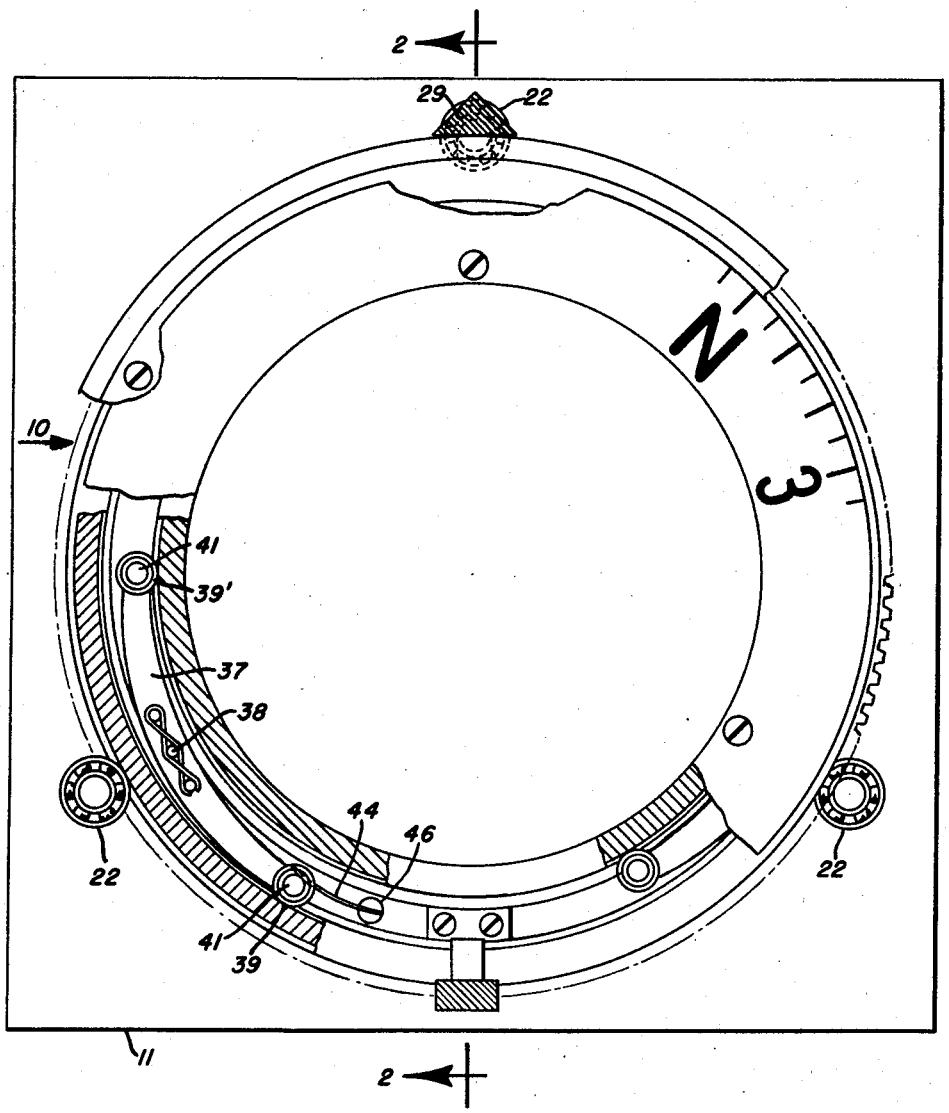
Figure 1 is a top view of my novel ring gear assembly having compass card, heading, and bearing indices attached thereto, parts of the drawing being shown broken away for clarity.

Reference is first made to Figures 1 and 2 of the drawings wherein my novel ring gear assembly, designated generally by the reference numeral 10, is shown mounted upon a base plate 11. The ring gear assembly includes an outer ring 12, inner ring 13, and a central ring 14 having suitable ring gears 16, 17 and 18, respectively, attached thereto by bolts 19, or any other suitable means. If desired, the ring gears 16, 17 and 18 may be formed integrally with the respective rings 12, 13 and 14. As best seen in Figure 2, an external raceway 21 is formed on the outer ring 12, which raceway is made concentric with the pitch diameter of the associated ring gear 16. A three point suspension for the outer ring 12 is provided by three ball bearings 22 rotatably mounted on the upper ends of posts 23, which are provided with threaded studs 24 at the lower end thereof extending through suitable holes in the base 11 and secured thereto by nuts 26. One of the post members 23, as seen in Figure 2 at the right side thereof, is provided with an eccentrically mounted upper portion, designated 23'. The axis of the bearing 22, secured thereto, is thereby movably adjustable upon rotation of the post 23. In order to mount the outer ring 12 within the bearings 22, the post 23, having the eccentric portion 23' thereon, is merely rotated to a position wherein the ring 12 is easily positioned between the bearings 22. Proper adjustment between the three bearings 22 and the outer ring 12 is made by rotating the post 23 having the eccentric portion 23' thereon to the proper position.

When the ring gear assembly of my invention is used in a horizontal situation display indicator of the type described above, the outer ring 12 is provided with a bearing pointer ring 27 which is secured thereto by bolts 28 threadedly engaging the ring. An arrow head-shaped marker, or bearing pointer 29, extend from the bearing pointer ring 27 and is positioned to read the bearing of a station or target against a compass card 31 secured by bolts 32 to the inner ring 13. A heading marker bracket 33, having a rectangular shaped heading marker 34 formed at the upper end thereof, is secured by a pair of bolts 36 to the threaded apertures in the center ring 14. The rectangular shaped heading marker 34 cooperates with the compass card 31 to provide an indication of the desired heading. It will be understood that the ring gears 16, 17 and 18, to which the bearing pointer, compass card and heading marker are secured through the respective rings 11, 13 and 14, may be driven by suitable pinion gears (not shown) engaging the same; the respective pinion gears being connected to bearing, compass card, and heading servo motors (not shown) in the aircraft navigational system.

The novel mounting arrangement for the three rings 12, 13 and 14, includes three rocker arms 37 pivotally supported adjacent upright posts 38 extending from the center ring 14 and spaced 120° apart thereon. The ends of the rocker arms are provided with bearings 39 and 39' mounted upon posts 41 extending upwardly from the rocker arms. (The bearings 39 and 39', at the opposite ends of the rocker arms, although identical in construction, are given separate reference characters for purposes of description.) As best seen in Figure 2, internal and external raceways 42 and 43 are formed in the respective outer ring 12 and inner ring 13. The three bearings, designated 39, at like ends of the three rocker arms 37, engages the internal raceway 42 on the outer ring 12 at points 120 degrees apart thereon, while the bearings designated 39', which are similarly situated at the other end of the three rocker arms 37, engage the external raceway 43 on the inner ring 13.

Reference is now also made to Figure 3, wherein an enlarged fragmentary top view of the center ring 14, with a rocker arm attached thereto, is shown. It will be seen that a leaf spring 44 is attached to a post 46 extending from the center ring 14, which spring engages the rocker arm. It will be understood that similarly mounted leaf springs are mounted on the central ring 14 for biasing the other two rocker arms. The leaf springs bias the rocker arms in the counter-clockwise direction about the axis of rotation adjacent the pins 38, as viewed from the top, whereby the bearings 39 and 39' are urged into the respective raceways 42 and 43 in the outer and inner rings 12 and 13, and maintained therewithin. Thus, it will be seen that relative rotary movement between the three rings 12, 13 and 14 is provided by the bearings 39, 39' on the rocker arms 37 which, in turn, are pivotally mounted on the central ring 14.

It will here be noted that the internal and external raceways 42 and 21 on the outer ring 12 are made concentric with the pitch diameter of the ring gear 16, while the external raceway 43 on the inner ring 13 is made concentric with the pitch diameter of the ring gear 17 thereon. It will be understood that by attaching the ring gears 16 and 17 to the rings 12 and 13, respectively, and then machining the raceways 42, 21 and 43 therein, the raceways are easily formed concentrically with the pitch diameters of the respective gears.

The torsional force, or effect, of the springs 44 on the individual rocker arms is adjustable through the spring mounting arrangement. Reference is made to Figure 4 of the drawings, wherein there is shown an enlarged fragmentary sectional view taken on line 4—4 of Figure 3 of the spring mounting. The post 46 is provided with a slot 47 therein within which the spring 44 is positioned. A locking pin 48 extends through the mounting post 46 and spring 44, securing the same together. The post 46 is provided with a reduced diameter portion which extends through a hole through the ring 14 and gear 18. A nut engages the threaded end of the reduced diameter of the post securing the post to the rings. With such a mounting arrangement, the spring tension, or bias of the spring against the rocker arm 37 is adjusted upon rotation of the post 46. The springs are adjusted to a position wherein the three rings 12, 13 and 14 turn concentrically.

It will be understood that although the raceways are made concentric with the pitch diameter of the gears of the associated rings, it is not necessary that any exact ratio be maintained between the diameters of the various raceways. That is, the diameter of each raceway does not have to be made to close tolerances, since the pivotal rocker arms compensate for variations in the raceway diameters. By pivotally mounting the rocker arms on the central ring 14, relatively large variations in the raceway diameters are permitted without adversely effecting the concentric rotation of the rings. The rings are, therefore, easily manufactured at a minimum cost since expensive, close tolerance, machining operations are unnecessary. Further, the assembly works satisfactorily over a wide range of temperatures, since changes in dimension, due to thermal coefficient of expansion of the parts, does not impair the concentric rotation of the rings.

For proper functioning of the ring assembly, it will be apparent that each of the roller bearings 39 and 39' must contact its associated raceways. If the rocker arms 37 are pivoted about fixed centers on the central ring 14, such pivot points would have to be accurately located in manufacturing of the device. Further, dimensional changes in the rocker arm support ring 14, which resulted in altering the location of the fixed pivot points for the rocker arms from a circle concentric with the raceways, would result in a situation wherein not all bearing members 39 and 39' engaged the respective raceways 42 and 43. Therefore, to assure contact between the above bearing members and raceways at all times, I provide "floating" pivot points about which the rocker arms may rotate, which construction is best seen in Figure 3 and the fragmentary top and sectional views of Figures 5 and 6, respectively. Referring, then, to Figures 3, 5 and 6, it will be noted that a radially extending slot 51 is formed in the rocker arm 37, through which the outer end of the upright post 38 extends. An "E" ring fastening device 52 fits within an annular groove formed in the post 38 to limit the axial movement of the rocker arm on the post. As seen in Figures 3 and 5, posts 53 extend upwardly from the rocker arm on opposite sides of the slotted aperture. Radial displacement compensating springs 54, each comprising a length of spring steel wire, or the like, are attached to the posts 53 in annular grooves formed in the posts. The wire springs contact the posts 38 in suitable annular grooves formed therein, in a manner wherein one-half of the radial displacement compensating spring wire serves to bias the rocker arm radially outwardly of the ring 14, while the other one-half length of the spring biases the rocker arm radially inwardly thereof. The rocker arm is, therefore, free to move radially of the ring 24 for the entire length of the slot 51 formed therein, against the biasing action of spring 54 when the movement thereof is away from the slot center.

With the above arrangement, the point about which the rocker arm 37 pivots is not fixed, but is free to float. The radial displacement compensating springs, therefore, restrict the rocker arms to pivotal movement about an instantaneous center, rather than about the line of contact between the bearings 39, 39' and raceways 42 and 43.

Having now described my invention in detail, in accordance with the patent statutes, various changes and modifications will suggest themselves to those skilled in this art. It is intended that such changes and modifications shall fall within the spirit and scope of the invention, as recited in the following claims.

I claim:

1. An arrangement for rotatably mounting a plurality of coaxial rings comprising, a plurality of rocker arms pivotally mounted intermediate the ends thereof on a first ring, and means biasing the said rocker arms to maintain one end of each in engagement with an inner surface of a second ring and the other end of each in engagement with an outer surface of a third ring.

2. The invention as recited in claim 1 wherein the said rings comprise ring gears adapted to be individually driven.

3. An arrangement for rotatably mounting coaxial inner, outer, and center rings comprising, a plurality of rocker arms pivotally mounted intermediate the ends thereof on the said center ring, and means biasing the said rocker arms to maintain one end of each in engagement with an inner surface of the outer ring and the other end of each in engagement with an outer surface of the inner ring.

4. The invention as recited in claim 3 wherein the said inner, outer and center rings comprise ring gears adapted to be individually driven.

5. An arrangement for rotatably mounting coaxial inner, outer, and center annular rings comprising, means forming internal and external raceways on the respective outer and inner rings, a plurality of rocker arms pivotally mounted intermediate the ends thereof on the said center ring, bearing means mounted adjacent the ends of the rocker arms, and means rotatably biasing the said rocker arms to maintain the corresponding bearing means adjacent one end in engagement with the said internal raceway and the corresponding bearing means adjacent the other end in engagement with the said internal raceway.

6. The invention as recited in claim 5 wherein the said inner, outer and center rings comprise ring gears adapted to be individually driven.

7. The invention as recited in claim 5 wherein a total of three rocker arms are pivotally mounted on the said center ring.

8. The invention as recited in claim 5 wherein each mounting for the rocker arms on the said center ring comprises a post extending from the center ring axially thereof, means forming a transversely extending elongated slot in the rocker arm intermediate the ends thereof, the said post extending through the said slot, and resilient means engaging the said post and rocker arm and normally maintaining the post a spaced distance from the slot ends.

9. An arrangement for rotatably mounting coaxial inner, outer and center rings comprising, a base plate, a plurality of posts extending from the base plate, bearings mounted on the posts, means forming an internal and external raceway on the said outer ring, the bearings on the posts engaging the external raceway on the ring, means forming an external raceway on the said inner ring, a plurality of rocker arms, each of the said rocker arms being pivotally supported intermediate the ends thereof and rotatable about a radially movable axis on the said center ring, bearings mounted on the rocker arms adjacent the ends thereof, and means pivotally biasing the said rocker arms about the radially movable axis to maintain the corresponding bearing means adjacent one end in engagement with the said internal raceway on the outer ring and the corresponding bearing means adjacent the other end in engagement with the said external raceway on the inner ring.

No references cited.